(12) United States Patent
Krochmal et al.

(10) Patent No.: US 7,868,515 B2
(45) Date of Patent: Jan. 11, 2011

(54) THIN LAMINATE CONSTRUCTION FOR THE CREATION OF TACTILE FEEDBACK

(75) Inventors: Andrew Cyril Krochmal, Plymouth, MI (US); Douglas Allen Pfau, Canton, MI (US); David Michael Whitton, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 485 days.

(21) Appl. No.: 12/103,216

(22) Filed: Apr. 15, 2008

(65) Prior Publication Data

US 2009/0255793 A1 Oct. 15, 2009

(51) Int. Cl.
*H02N 2/00* (2006.01)
(52) U.S. Cl. .................................................. 310/309
(58) Field of Classification Search ............... 310/309
See application file for complete search history.

(56) References Cited

U.S. PATENT DOCUMENTS

| | | | | |
|---|---|---|---|---|
| 2,975,307 | A * | 3/1961 | Schroeder et al. | 310/309 |
| 3,678,655 | A * | 7/1972 | Rose | 96/64 |
| 5,206,557 | A * | 4/1993 | Bobbio | 310/309 |
| 5,652,704 | A | 7/1997 | Catanzarite | |
| 5,993,358 | A | 11/1999 | Gureghian et al. | |
| 6,255,758 | B1 * | 7/2001 | Cabuz et al. | 310/309 |
| 6,809,462 | B2 * | 10/2004 | Pelrine et al. | 310/319 |
| 6,841,917 | B2 * | 1/2005 | Potter | 310/309 |
| 7,148,875 | B2 | 12/2006 | Rosenberg et al. | |
| 7,538,760 | B2 * | 5/2009 | Hotelling et al. | 345/173 |
| 2004/0008191 | A1 * | 1/2004 | Poupyrev et al. | 345/184 |
| 2004/0164971 | A1 | 8/2004 | Hayward et al. | |
| 2005/0067919 | A1 * | 3/2005 | Horning | 310/309 |
| 2005/0274563 | A1 | 12/2005 | Ahnafield | |
| 2007/0247420 | A1 | 10/2007 | Strohband et al. | |

FOREIGN PATENT DOCUMENTS

| | | |
|---|---|---|
| DE | 19852315 | 5/2000 |
| EP | 1621441 | 2/2006 |

* cited by examiner

*Primary Examiner*—Thomas M Dougherty
(74) *Attorney, Agent, or Firm*—Fraser Clemens Martin & Miller LLC; J. Douglas Miller

(57) ABSTRACT

A tactile laminate and a method for generating tactile feedback, wherein the tactile laminate and method provide a flexible laminate for creating a tactile sensation on a desired surface without the need for separate motion generating devices, is disclosed. A tactile laminate includes a first layer having a first conductive pad disposed thereon, the first conductive pad adapted to receive a first desired electric charge, a second layer having a second conductive pad disposed thereon, the second conductive pad adapted to receive a second desired electric charge, and a third layer having a desired permittivity disposed between the first layer and the second layer.

20 Claims, 1 Drawing Sheet

THIN LAMINATE CONSTRUCTION FOR THE CREATION OF TACTILE FEEDBACK

FIELD OF THE INVENTION

The present invention relates to haptics. More particularly, the invention is directed to a tactile laminate and a method for generating tactile feedback.

BACKGROUND OF THE INVENTION

Haptic technology refers to technology which interfaces the user via the sense of touch by applying forces, vibrations, and/or motions to the user. This mechanical stimulation may be used to supply a tactile feedback to the user of a vehicle or other machine to indicate the operational status or condition of the vehicle or machine. Known tactile interface devices are typically constructed as integrated devices, where haptic-enabling components (e.g., actuators and associated control circuits) are integrated with other functional components to form a single structure for a given device. Currently, separate haptic-enabling components are used to generate a desired motion of a surface of interest, thereby creating a tactile feedback (i.e. a tactile sensation) on the surface of interest. Typically, the integrated haptic-enabling components increase the complexity, size, and cost of the tactile interface device and further limit the application of the tactile interface device.

It would be desirable to have a tactile laminate and a method for generating tactile feedback, wherein the tactile laminate and method provide a flexible laminate for creating a tactile sensation on a desired surface without the need for separate motion generating devices.

SUMMARY OF THE INVENTION

Concordant and consistent with the present invention, a tactile laminate and a method for generating tactile feedback, wherein the tactile laminate and method provide a flexible laminate for creating a tactile sensation on a desired surface without the need for separate motion generating devices, has surprisingly been discovered.

In one embodiment, a tactile laminate comprises a first layer having a first conductive pad disposed thereon, the first conductive pad adapted to receive a first desired electric charge, a second layer having a second conductive pad disposed thereon, the second conductive pad adapted to receive a second desired electric charge, and a third layer having a desired permittivity disposed between the first layer and the second layer.

In another embodiment, a tactile laminate comprises a first layer having a first conductive pad disposed thereon, the first conductive pad adapted to receive a first desired electric charge, a second layer having a second conductive pad disposed thereon, the second conductive pad adapted to receive a second desired electric charge, a third layer having a desired permittivity disposed between the first layer and the second layer, a first charging circuit adapted to charge the first conductive plate with the first desired electric charge, and a second charging circuit adapted to charge the second conductive plate with the second desired electric charge.

The invention also provides methods for generating tactile feedback.

One method comprises the steps of: providing a tactile laminate including at least a first layer having a first conductive pad disposed thereon, the first conductive pad adapted to receive a first desired electric charge, a second layer having a second conductive pad disposed thereon, the second conductive pad adapted to receive a second desired electric charge, and a third layer having a desired permittivity disposed between the first layer and the second layer; charging the first conductive pad with the first desired electric charge; and charging the second conductive pad with the second desired electric charge, wherein the charge of the first conductive pad and the charge of the second conductive pad generate a desired motion of each of the first layer and the second layer to create a tactile feedback.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
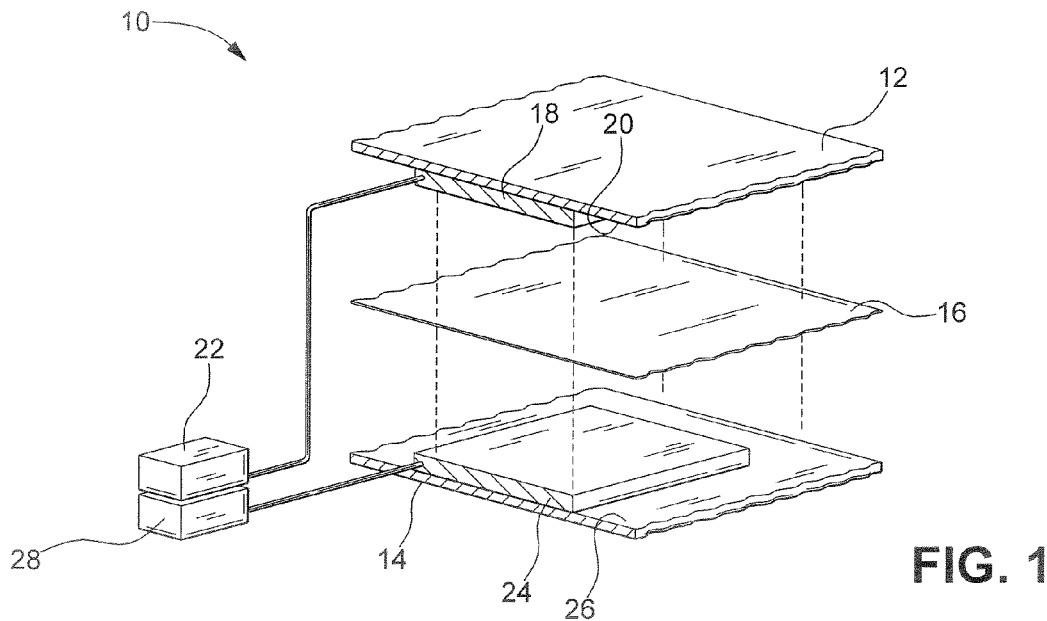
FIG. 1 is an exploded perspective view of a tactile laminate in electrical communication with a plurality of charging circuits according to an embodiment of the present invention, wherein a portion of the tactile laminate is shown in section.
Figure 2:
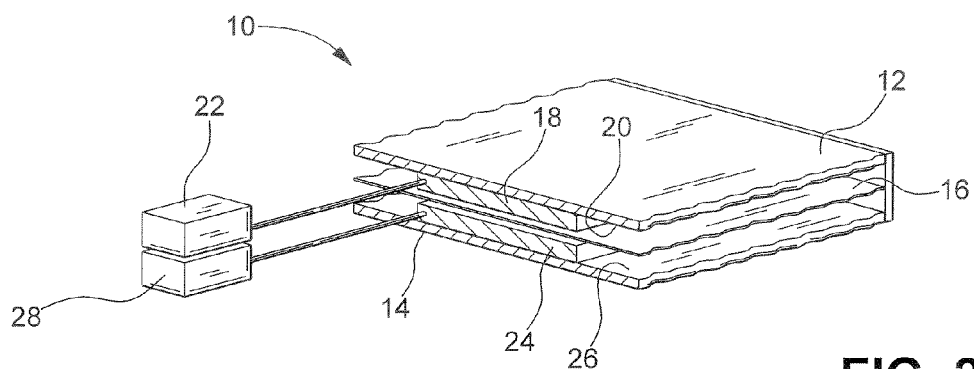
FIG. 2 is a perspective view of the tactile laminate of FIG. 1 assembled in an uncharged state.
Figure 3:
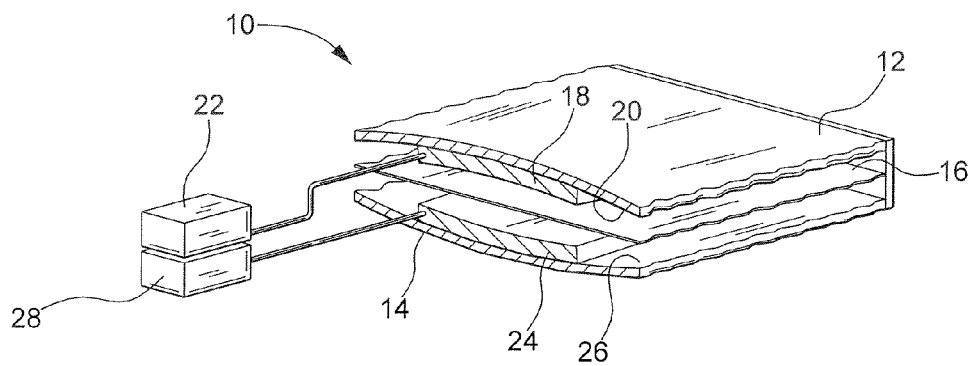
FIG. 3 is a perspective view of the tactile laminate of FIG. 2 shown in a charged state.

FIGS. 1, 2, and 3 show a tactile laminate 10 according to the present invention. The tactile laminate 10 includes a first layer 12, a second layer 14, and a third layer 16 disposed between the first layer 12 and the second layer 14. The first layer 12, the second layer 14, and the third layer 16 are mechanically coupled to each other on the perimeter. However, the first layer 12, the second layer 14, and the third layer 16 are free to separate in the center. It is understood that any conventional means for coupling the layers 12, 14, 16 on the perimeter may be used, as desired.

The first layer 12 is formed from any flexible non-conductive material. The first layer 12 may have any thickness and size, as desired. The first layer 12 includes a first conductive pad 18. The first conductive pad 18 is coupled to a first side 20 of the first layer 12 using any conventional means for coupling, as desired. It is understood that the first conductive pad 18 may have any size and thickness, as desired. The first conductive pad 18 is adapted to be electrically charged by a first charging circuit 22. The first charging circuit 22 may be any circuit or device adapted to charge the first conductive pad 18 with a first desired electric charge such as an amplifier, for example. It is understood that the first conductive pad 18 may be charged by other sources of electrical energy, as desired. The first charging circuit 22 is adapted to control the first desired electric charge on the first conductive pad 18, thereby controlling a desired voltage. It is understood that the first charging circuit 22 is adapted to vary the charge of the first conductive pad 18, as desired.

The second layer 14 is formed from any flexible non-conductive material. The second layer 14 may have any thickness and size, as desired. The second layer 14 includes a second conductive pad 24. The second conductive pad 24 is coupled to a first side 26 of the second layer 14 using any conventional means for coupling, as desired. It is understood that the second conductive pad 24 may have any size and thickness, as desired. The second conductive pad 24 is adapted to be electrically charged by a second charging circuit 28. The second charging circuit 28 may be any circuit or device adapted to charge the second conductive pad 24 with a second desired electric charge such as an amplifier, for example. It is understood that the second conductive pad 24 may be charged by other sources of electrical energy, as desired. The second charging circuit 28 is adapted to control the second desired electric charge on the second conductive pad 24, thereby controlling a desired voltage. It is understood that the second charging circuit 28 is adapted to vary the charge of the second conductive pad 24, as desired.

The third layer 16 is formed from a dielectric having a desired permittivity such as silicon and mica, for example. Other dielectrics may be used, as desired. It is understood that that the third layer 16 may be formed from any material having the desired permittivity. The third layer 16 is disposed between the first layer 12 and the second layer 14. Specifically, the third layer 16 is disposed between the first conductive pad 18 and the second conductive pad 24. As shown, the third layer 16 is spaced from the first conductive pad 18 and the second conductive pad 24. It is understood that the third layer 16 may be disposed at any distance from the first conductive pad 18, as appropriate. It is further understood that the third layer 16 may be disposed at any distance from the second conductive pad 24, as appropriate.

In use the first charging circuit 22 charges the first conductive pad 18 and the second charging circuit 28 charges the second conductive pad 24. Specifically, the charging circuits 22, 28 charge the respective conductive pads 18, 24 with electric charge to generate a repulsive force that will cause the first layer 12 and the second layer 14 to separate, as shown in FIG. 3. It is understood that the voltage across each of the conductive pads 18, 24 may be changed to generate a desired motion in the first layer 12 and the second layer 14. As a non-limiting example, the desired motion of the first layer 12 and the second layer 14 may generate a vibratory sensation of variable intensity and/or frequency to a user making contact with the tactile laminate 10. Other sensations may be generated, as desired. The tactile laminate 10 may be any thickness, as desired. Further, the tactile laminate 10 may be disposed on any rigid surface, as desired. It is understood that any number of tactile laminates 10, each including the first layer 12, the second layer 14, and the third layer 16, may be disposed adjacent another of the tactile laminates 10 to form a stacked laminate (not shown). It is further understood that the stacked laminate may be used to generate a tactile feedback in the same manner as the individual tactile laminate 10.

The tactile laminate 10 according to the present invention may be disposed on a rigid surface to provide a tactile feedback on the rigid surface. The tactile laminate 10 and the method for generating a tactile feedback provide a flexible laminate for creating a tactile sensation on a desired surface without the need for separate motion generating devices.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A tactile laminate comprising;
   a first layer having a first conductive pad disposed thereon, the first conductive pad adapted to receive a first desired electric charge;
   a second layer having a second conductive pad disposed thereon, the second conductive pad adapted to receive a second desired electric charge; and
   a third layer having a desired permittivity disposed between the first layer and the second layer.

2. The tactile laminate according to claim 1, further comprising a first charging circuit adapted to charge the first conductive plate with the first desired electric charge.

3. The tactile laminate according to claim 1, further comprising a second charging circuit adapted to charge the second conductive plate with the second desired electric charge.

4. The tactile laminate according to claim 1, wherein the third layer is formed from a dielectric.

5. The tactile laminate according to claim 1, wherein the third layer is formed from at least one of silicon and mica.

6. The tactile laminate according to claim 1, wherein the first layer and the second layer are each formed from a non-conductive material.

7. The tactile laminate according to claim 1, wherein the first desired electric charge on the first conductive pad and the second desired electric charge on the second conductive pad are each controlled to generate a desired motion of each of the first layer and the second layer.

8. The tactile laminate according to claim 1, wherein a plurality of the tactile laminates are disposed adjacent one another to form a laminate stack.

9. The tactile laminate according to claim 1, wherein the tactile laminate is disposed on a rigid surface to generate a tactile feedback on the rigid surface.

10. A tactile laminate comprising;
    a first layer having a first conductive pad disposed thereon, the first conductive pad adapted to receive a first desired electric charge;
    a second layer having a second conductive pad disposed thereon, the second conductive pad adapted to receive a second desired electric charge;
    a third layer having a desired permittivity disposed between the first layer and the second layer;
    a first charging circuit adapted to charge the first conductive plate with the first desired electric charge; and
    a second charging circuit adapted to charge the second conductive plate with the second desired electric charge.

11. The tactile laminate according to claim 10, wherein the third layer is formed from a dielectric.

12. The tactile laminate according to claim 10, wherein the first desired electric charge on the first conductive pad and the second desired electric charge on the second conductive pad are each controlled to generate a desired motion of each of the first layer and the second layer.

13. The tactile laminate according to claim 10, wherein a plurality of the tactile laminates are disposed adjacent one another to form a laminate stack.

14. The tactile laminate according to claim 10, wherein the tactile laminate is disposed on a rigid surface to generate a tactile feedback on the rigid surface.

15. A method for generating tactile feedback, the method comprising the steps of:
    providing a tactile laminate including at least a first layer having a first conductive pad disposed thereon, the first conductive pad adapted to receive a first desired electric charge, a second layer having a second conductive pad disposed thereon, the second conductive pad adapted to receive a second desired electric charge, and a third layer having a desired permittivity disposed between the first layer and the second layer;

charging the first conductive pad with the first desired electric charge; and charging the second conductive pad with the second desired electric charge, wherein the charge of the first conductive pad and the charge of the second conductive pad generate a desired motion of each of the first layer and the second layer to create a tactile feedback.

16. The method according to claim 15, further comprising the step of:

providing a first charging circuit adapted to charge the first conductive plate with the first desired electric charge.

17. The method according to claim 15, further comprising the step of:

providing a second charging circuit adapted to charge the second conductive plate with the second desired electric charge.

18. The method according to claim 15, wherein the third layer is formed from a dielectric.

19. The method according to claim 15, wherein the first desired electric charge on the first conductive pad and the second desired electric charge on the second conductive pad are each controlled to generate the desired motion of each of the first layer and the second layer.

20. The method according to claim 15, further comprising the step of:

disposing the tactile laminate on a rigid surface to generate a tactile feedback on the rigid surface.

* * * * *